United States Patent [19]

Herr et al.

[11] Patent Number: 4,881,640

[45] Date of Patent: Nov. 21, 1989

[54] ARTICLE FOR STORING OPTICALLY READABLE AND RECORDABLE DISC DEVICES

[75] Inventors: Arthur Herr, New York, N.Y.; Toby S. Welles, Norwalk; Robert W. Johnson, Westport, both of Conn.

[73] Assignee: Reynard CVC, Inc., New York, N.Y.

[21] Appl. No.: 237,581

[22] Filed: Aug. 26, 1988

Related U.S. Application Data

[63] Continuation-in-part of Ser. No. 143,897, Jan. 13, 1988, Pat. No. 4,771,883.

[51] Int. Cl.⁴ .............................................. B65D 85/57
[52] U.S. Cl. ..................... 206/313; 220/347
[58] Field of Search ............... 206/307, 309, 311–313, 206/303, 444; 220/346, 347; 369/291

[56] References Cited

U.S. PATENT DOCUMENTS

| | | | |
|---|---|---|---|
| 2,500,773 | 3/1950 | Robbins | 310/10 |
| 2,850,158 | 9/1958 | Woodward | 206/312 |
| 2,866,541 | 12/1958 | Ravis | 206/313 |
| 3,232,421 | 2/1966 | Young | 206/472 |
| 3,730,602 | 5/1973 | Campbell et al. | 312/10 |
| 3,860,248 | 1/1975 | Hunt et al. | 206/309 |
| 3,876,134 | 4/1975 | Rice et al. | 206/312 |
| 3,888,350 | 6/1975 | Harvath | 220/347 |
| 3,951,264 | 4/1976 | Heidecker et al. | 206/309 |
| 4,174,034 | 11/1979 | Hoo | 220/347 |
| 4,266,784 | 5/1981 | Torrington | 369/77 |
| 4,316,539 | 2/1982 | Torrington | 206/307 |
| 4,387,802 | 6/1983 | Shearing et al. | 206/45 |
| 4,428,014 | 1/1984 | Saito | 360/133 |
| 4,463,849 | 8/1984 | Prusak et al. | 206/307 |
| 4,463,850 | 8/1984 | Gorog | 206/309 |
| 4,476,978 | 10/1984 | Saito | 206/312 |
| 4,535,888 | 8/1985 | Nusselder | 206/444 |
| 4,620,630 | 11/1986 | Moss | 206/45.24 |
| 4,635,792 | 1/1987 | Yamada et al. | 206/312 |
| 4,664,261 | 5/1987 | Frodelius | 206/387 |
| 4,694,954 | 9/1987 | Moss | 206/45.26 |
| 4,694,957 | 9/1987 | Ackeret | 206/309 |
| 4,702,369 | 10/1987 | Philasophe | 206/312 |
| 4,709,812 | 12/1987 | Kosterka | 206/310 |
| 4,722,439 | 2/1988 | Groebecker et al. | 206/312 |
| 4,726,615 | 2/1988 | Goldberg | 294/16 |
| 4,728,157 | 3/1988 | David, Jr. | 312/12 |
| 4,771,883 | 9/1988 | Herr et al. | 206/313 |

FOREIGN PATENT DOCUMENTS

| | | |
|---|---|---|
| 1201203 | 2/1986 | Canada . |
| 0035933 | 9/1981 | European Pat. Off. ............ 206/312 |
| 0157056 | 10/1985 | European Pat. Off. . |
| 0181835 | 5/1986 | European Pat. Off. . |
| 0212377 | 3/1987 | European Pat. Off. . |
| 3414903 | 10/1985 | Fed. Rep. of Germany . |
| 3610623 | 10/1987 | Fed. Rep. of Germany . |
| 0021009 | of 1907 | United Kingdom ................ 206/313 |
| 2064486 | 6/1981 | United Kingdom . |
| 2147262 | 5/1985 | United Kingdom . |
| 2181038 | 4/1987 | United Kingdom . |
| 2184426 | 6/1987 | United Kingdom . |

OTHER PUBLICATIONS

Advertisement for CM 200 Series CD-ROM Drive from Laser Magnetic Storage International Company.
Advertisement for Toshiba CD-ROM Drive in CD-ROM Review, Jan./Feb., 1988.

Primary Examiner—Jimmy G. Foster
Attorney, Agent, or Firm—Pennie & Edmonds

[57] ABSTRACT

An insertable drawer member configured and dimensioned for receiving and storing digitally coded discs within an outer housing in a manner which ensures that information bearing areas of said discs are not damaged during insertion or removal therefrom, the insertable drawer member comprising: a base at least partially defined by a pair of opposed side walls, having upon its surface a semicircular groove configured for the insertion of a portion of the digitally coded disc by pressure contact, wherein only a non-information-bearing surface portion of the disc is ever contacted by the drawer member. The drawer member further comprises a lid integrally formed with the base and provided upon at least a portion of a front face thereof with a serrated gripping area to facilitate grasping and moving the drawer member to access the disc. A lower edge of the lid is configured for contact relation with an abutting V-shaped upper edge portion of the outer housing. The drawer member is additionally provided with means for retaining at least a portion thereof within the housing, which are operatively associated with corresponding means located upon an inner surface of the housing.

15 Claims, 10 Drawing Sheets

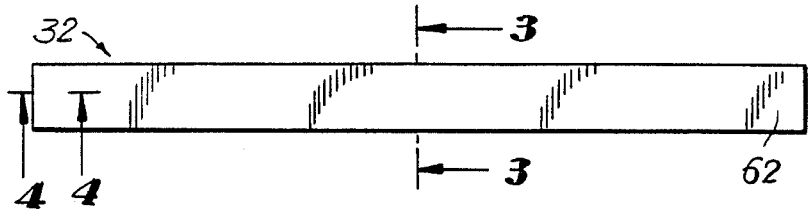
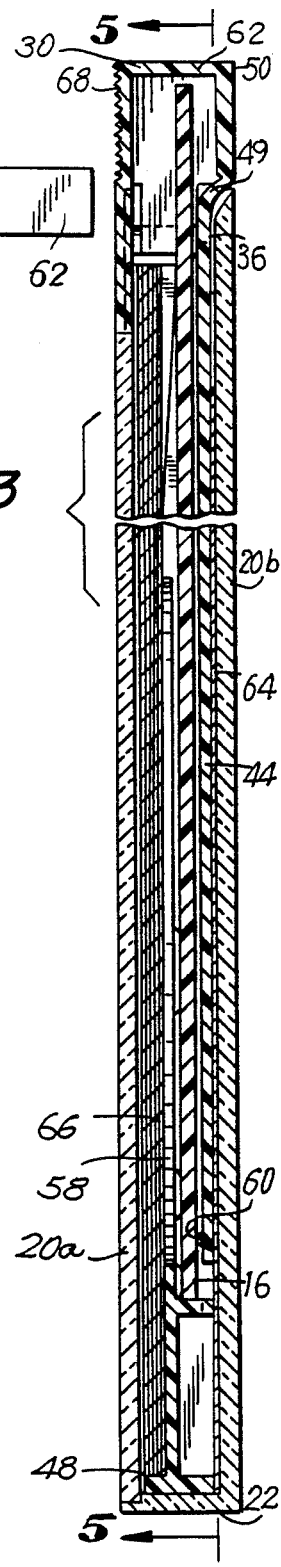
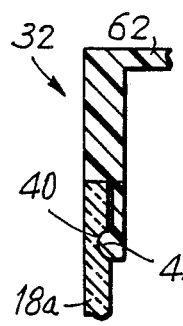
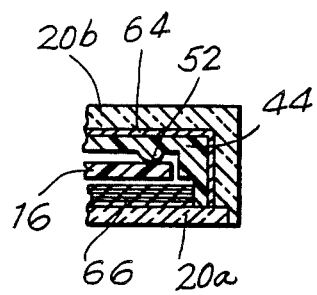
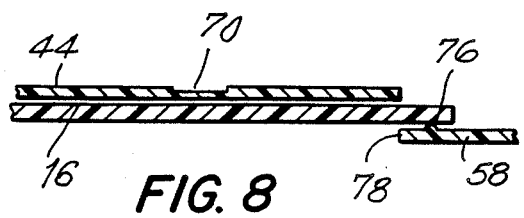

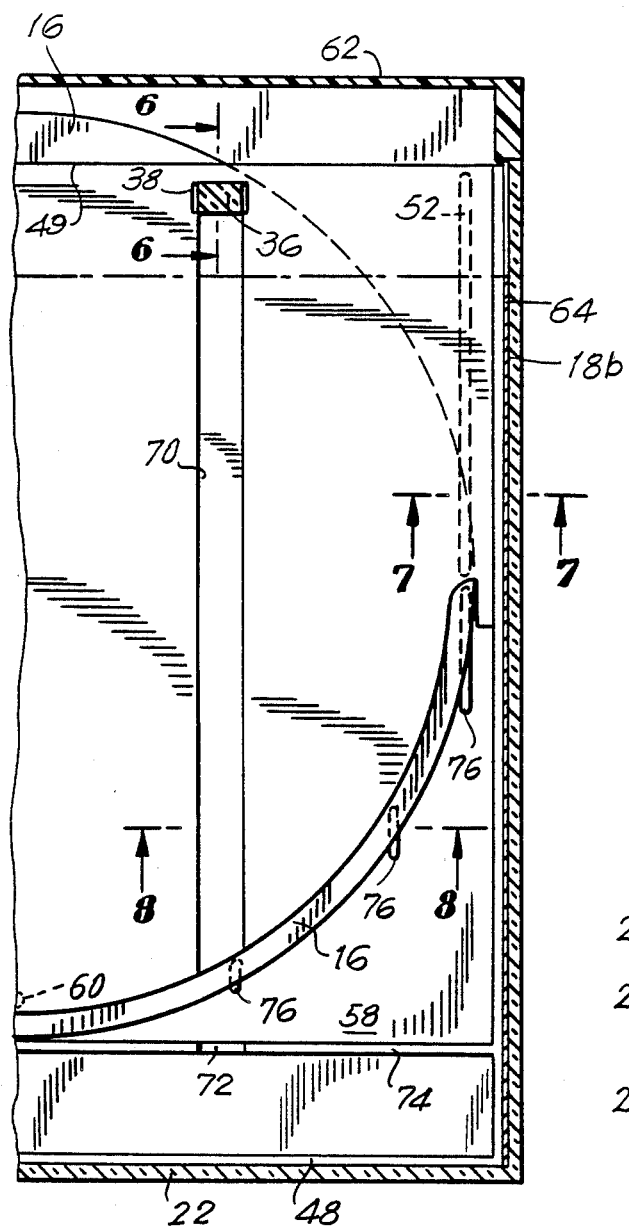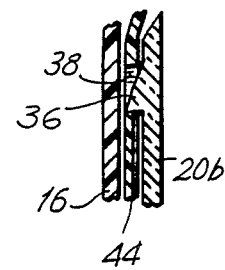

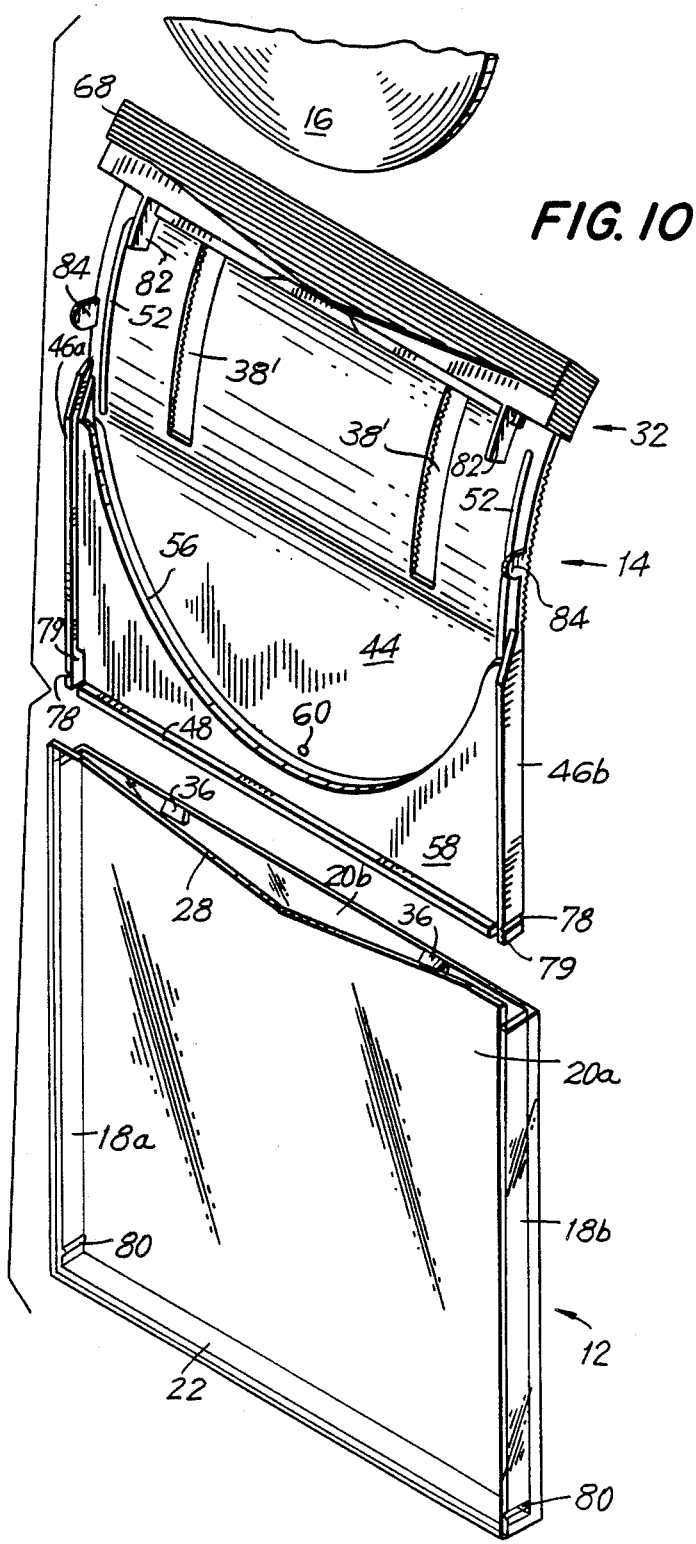

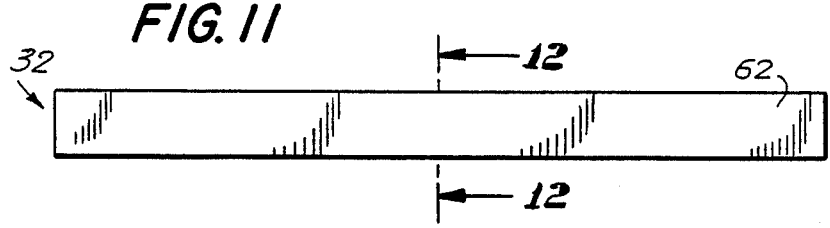
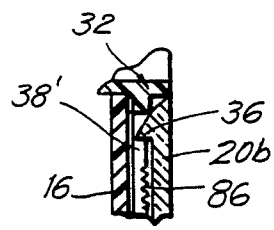
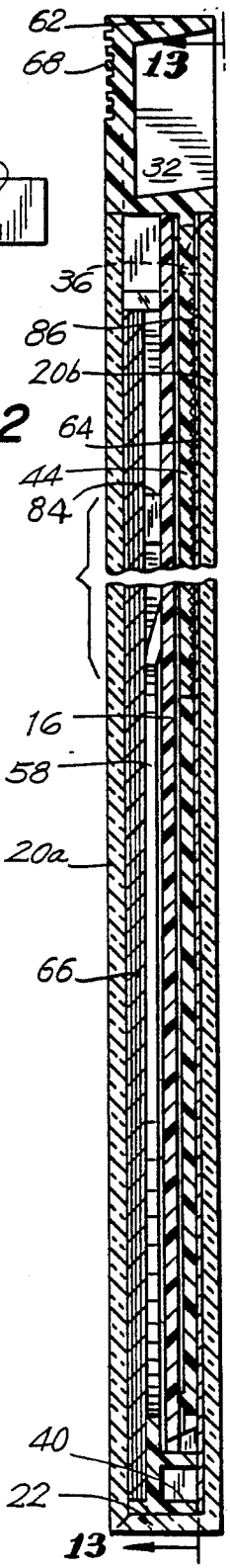
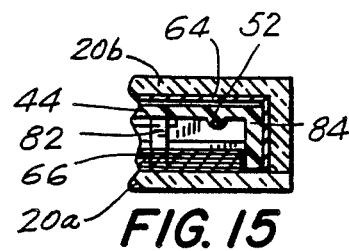
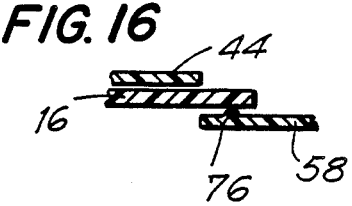
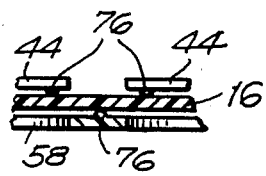
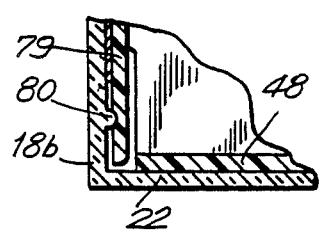
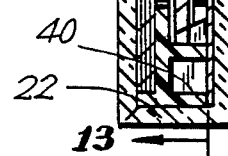

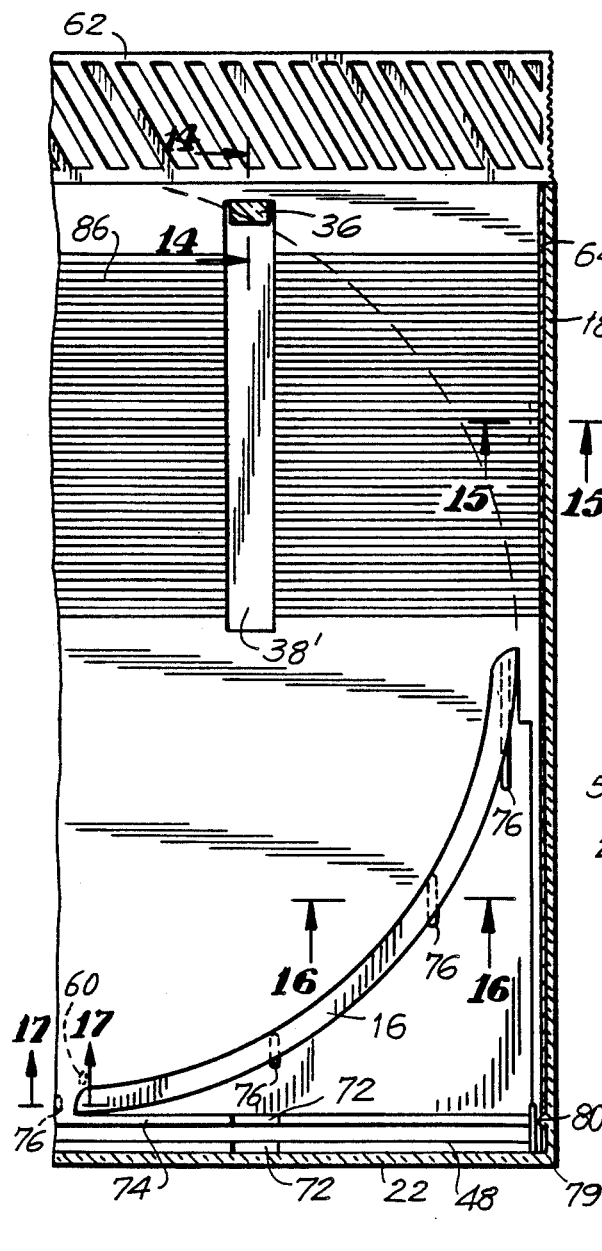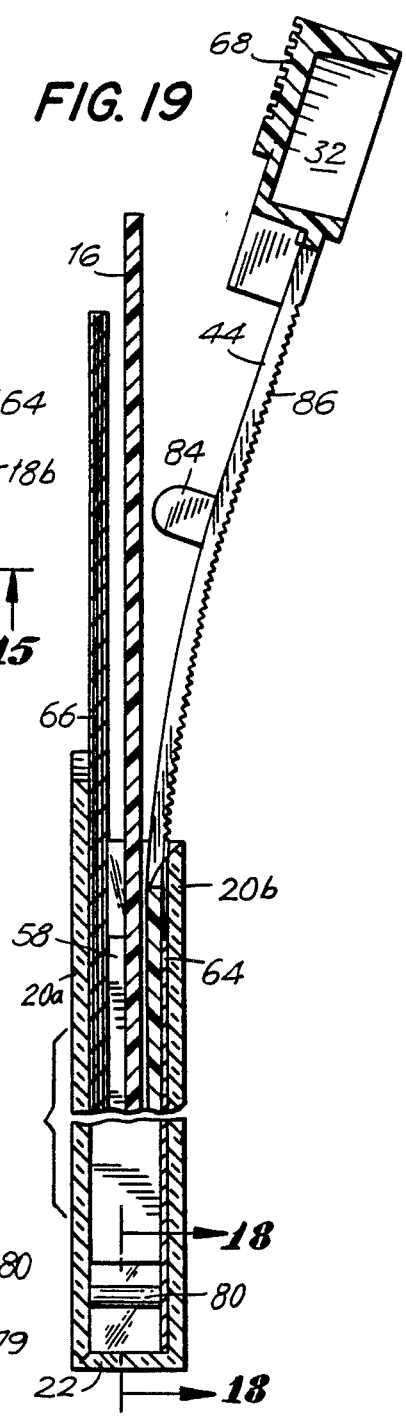

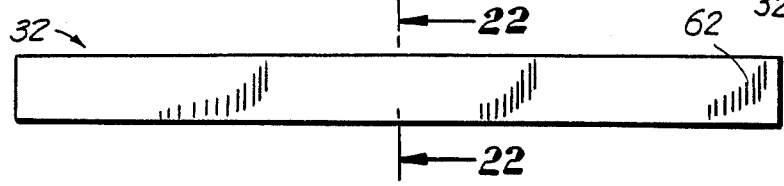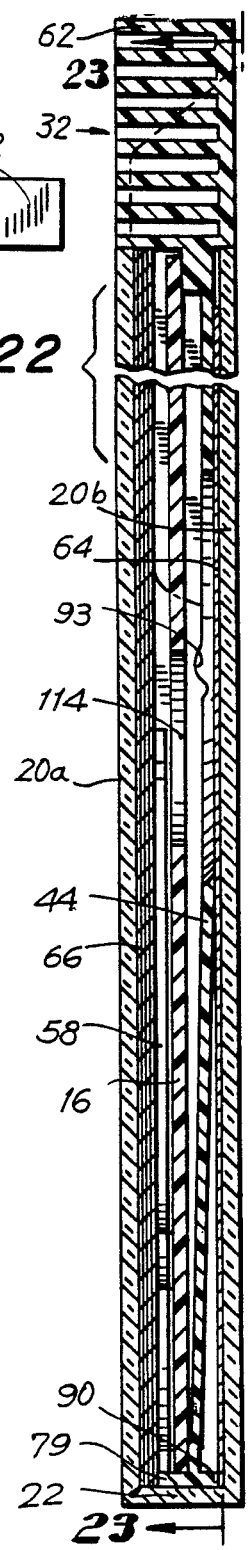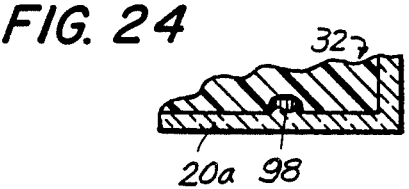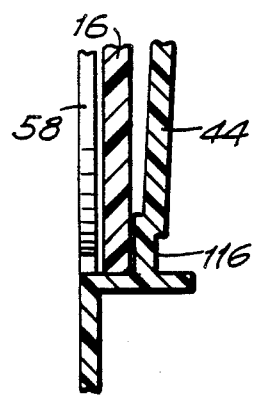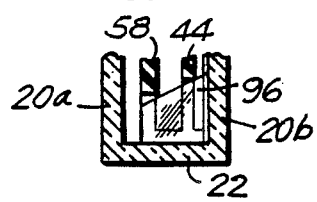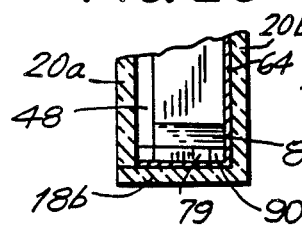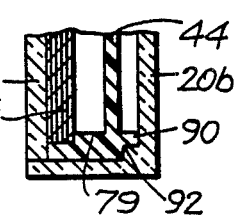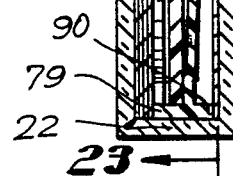

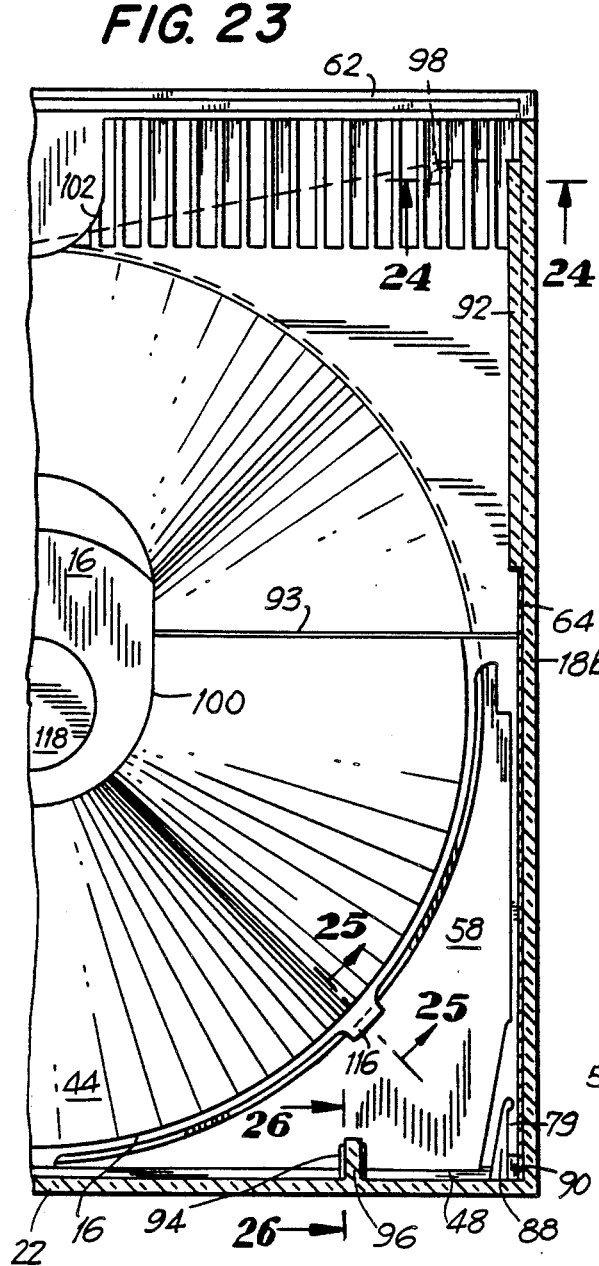
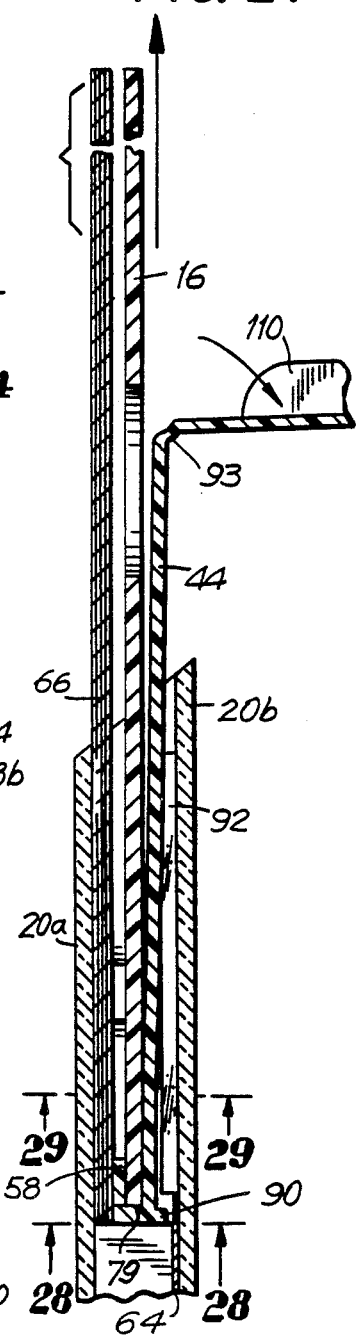

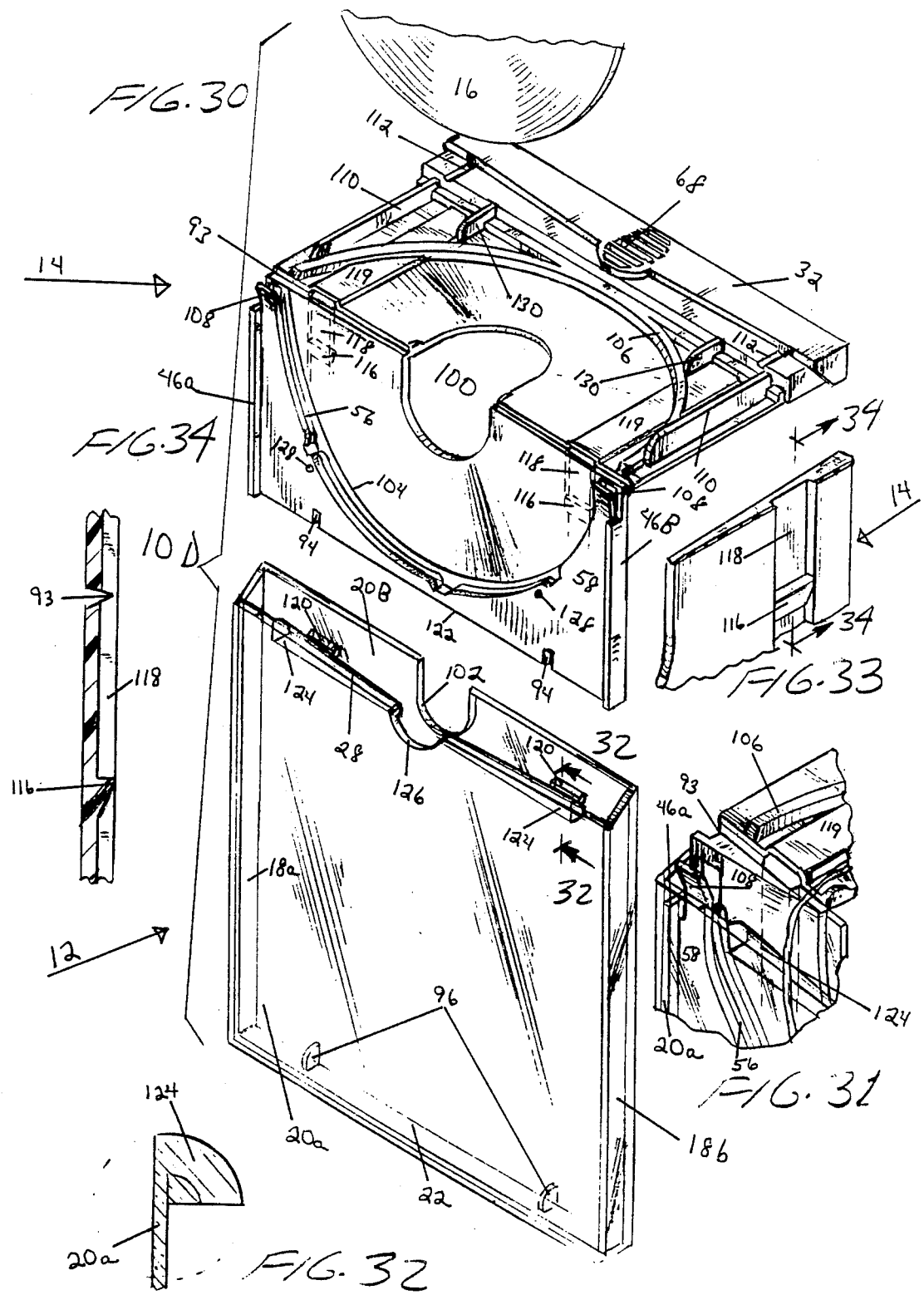

ARTICLE FOR STORING OPTICALLY READABLE AND RECORDABLE DISC DEVICES

CROSS-REFERENCE TO RELATED APPLICATION

This application is a continuation-in-part of application Ser. No. 143,897 filed Jan. 13, 1988, now U.S. Pat. No. 4,771,883.

TECHNICAL FIELD

The invention relates to a packaging concept for storing optically readable and recordable disc devices such as CDs (compact discs), CD-ROMs (compact disc, read-only-memory) and video laserdiscs. More specifically, it concerns a molded thermoplastic insert for an outer box-like housing used for this purpose. The package is configured to accept and secure the disc during periods of non-use.

BACKGROUND OF THE INVENTION

Compact discs ("CDs") were originally designed as a storage/reproduction medium for the digital recording of music. Discs created for this purpose utilize a plastic-coated, aluminized surface having a standard diameter measuring 4.72 inches (12 cm.) and a standard thickness of 1.2 mm. Audio information is placed on only one surface of the disc (to simplify the manufacturing process) in digital form as a track of microscopic pits in the thin, reflective aluminum layer. It is the spacing and length of these pits, each being about 1 micron in length, which determines what data the disc player unit "sees".

In order to "play" such a disc, an infrared beam from a semiconductor laser is focused upon the pits through a series of lenses and prisms. Light striking a pit is scattered whereas light hitting the smooth surface between pits is reflected back to a prism through a photo-detector, i.e., a diode, that converts light into an electronic signal. The resultant on and off digital signal is then decoded and fed through an electronic filter, thus converting it from digital form into an analog signal suitable for any hi-fi amplifier.

More recently, audio compact disc technology of the type described above has been combined with a computer application in order to create an optical storage system known as the CD-ROM (compact disc, read only memory), utilizing either the standard 4.72 inch compact audio disc or the 5¼ inch size accepted by American manufacturers as a standard for digital information storage. Each CD-ROM can store over 500 megabytes of information, i.e., approximately 275,000 pages of text, which is 1,500 times that of a floppy disc and 10–50 times that of a hard disc.

Blank optical discs are constructed of a layer of a heat-sensitive metal film, an organic polymer (e.g., a plastic) or a combination of both, deposited upon an aluminum platter similar to that used for magnetic hard discs. Optical recording techniques deposit digital information upon the surface of the disc by marking this surface in a number of fashions. These techniques include: ablative recording, in which a laser creates a series of pits in the coating layer; bubble forming, in which the laser's heat generates a tiny volume of gas in the underlying polymer, which becomes trapped and thus forms a bubble in the surface of the metal film layer; and crystalline to amorphous phase change, in which the reactive layer of the disc is changed from light-reflecting to transparent by the writing laser.

The protective plastic coating on the surface of an audio CD or CD-ROM prevents dust or debris from reaching its reflective metal surface. In contrast, information stored on, for example, hard discs, must be carefully protected from dust, smoke, fingerprints, heat and other damaging conditions that don't adversely affect a laser-read disc. Only significant scratches or blemishes can interfere with the laser light beam.

One common cause of such damaging scratches and/or blemishes is the removal and/or insertion of laser disc devices of the type described above from or into, respectively, a molded plastic storage case of the type commonly used to hold such discs. These cases contain many sharp edges which, if a disc is carelessly handled, can scratch or gouge the information-bearing surface of the disc and thus result in a loss of some or all of the information contained thereon.

A typical example of such a storage container is disclosed in U.S. Pat. No. 4,535,888 to Nusselder. This reference describes a plastic cassette suitable for the simultaneous storage of at least two discs having high information storage density such as, for example, an optically readable video disc or digital record. The cassette is provided with a box-shaped center portion having an intermediate bottom part respectively terminated at its upper and lower sides with a cover in the form of a box-shaped floor part. Each floor part is hingeably mounted at one side of the center part. The construction of this article enables a disc to be supported adjacent each floor portion and on either side of the intermediate bottom part by a raised seat and peg arrangement centrally disposed upon those parts. Storage cassettes constructed in this manner are commonly referred to as a "jewel-box" cassette due to their hinge-type construction.

SUMMARY OF THE INVENTION

Applicants have now developed a variety of storage cassettes for CDs, CD-ROMs, video laserdiscs and the like which overcome the disadvantages of the packaging utilized in the prior art. The present invention generally comprises a molded, insertable thermoplastic drawer member (i.e., "insert"), for placement within an outer box-like housing. The insert is configured and adapted for accepting and securing a disc of the type described above during periods of non-use.

Several embodiments of the invention have been described herein as illustrative of applicants' novel packaging concept. The invention should not, however, be construed as being limited solely to the embodiments illustrated in the attached drawing figures. That is to say, that the present invention relates as well to inserts not depicted in the drawings, which comprise a combination of features from two or more of the illustrated embodiments.

Each of the embodiments of applicants' storage cassette illustrated herein generally comprises a housing molded of a thermoplastic, such as polystyrene, containing an insert which is at least partially secured in some manner within the housing. The insert is molded of a polyolefinic thermoplastic, such as polypropylene and is provided with means for permitting the disc to be removably secured thereon without damage to the information-bearing surface thereof, such as that which may occur when a coded disc rides across a sharp plastic edge forming a portion of either the outer housing or the insert itself. Further, in addition to the disc, the package also normally contains a printed booklet and liner notes which carry promotional information such as song titles, artist biographies, etc.

The outer plastic housing of applicants' storage cassette remains substantively unchanged throughout each embodiment (i.e., A–C) disclosed herein. The housing is generally constructed having two pairs of oppositely disposed planar side members which are co-joined at a flat bottom member to form a generally rectangular box-like structure. In addition, the housing may optionally be provided with registration means which project into the interior thereof, such as the projecting members depicted with regard to embodiment C. These means assist in locating and seating a lower surface of the insert within the housing.

The housing in each instance has been provided with means for securing at least a portion of the insert therein when the package is opened in order to access the disc. In embodiments A and B, such securing means comprises a pair of integrally formed ramps spaced a distance apart on the rear (i.e., behind the insert) planar surface of the housing. These ramps project into the interior of the housing so as to engage, respectively, a corresponding pair of windows or channels extending entirely through the surface of the insert. In embodiment C, only a lower portion of the insert is secured within the housing. This is effected by a pair of flexible tab members located along both lateral edge portions of the insert. Each flexible tab is provided with a projecting finger which, when the insert is pulled about halfway out of the housing, engages a rib member formed integrally with the rear planar surface of the housing. This prevents the insert from traveling any further distance out of the housing and provides access to the upper half of the disc.

Further concerning the housing of applicants' storage cassette, the upper horizontal edge of the front planar surface, i.e., the closure member, in each of the illustrated embodiments is molded to have a broad, V-shaped profile. When the disc is inserted into or removed from the insert located within the interior of the housing, the V-shape edge on the upper surface of the closure member contacts only the edges, i.e., the non information bearing surfaces, of the disc, thus preventing the coded portions of the disc from being scratched or otherwise damaged. Such damage often leads to the loss of some or all of the information on the disc.

In addition to the similarities exhibited by the housing utilized with each embodiment of the invention, the various inserts include specific features to achieve the intended results. The purpose of the insert for use with each embodiment is, however, the same, i.e., to accept and secure a coded disc for storage during periods of non-use, while ensuring that the coded surfaces of the subject discs are not scratched or damaged during their passage into or out of the cassette storage package. Thus, each insert achieves the desired function in a slightly different manner.

The insert for use with embodiment A of applicants' storage cassette is tray-shaped and comprises a base portion defined by a pair of oppositely disposed vertical side walls and a horizontal bottom member which abuts the flat, bottom surface of the housing. Located upon an upper portion of the base and formed integrally therewith is the package lid, which is attached to the base portion by means of a living hinge. Extending perpendicularly downward from the lower surface of the lid are projecting tabs located along either side edge thereof. Each tab is formed with a projection which engages a corresponding notched portion on an upper surface of each of the lateral side walls of the housing.

The insert of embodiment A additionally comprises a pair of parallel vertical ribs positioned along the left and right edge portions, respectively, of the base. These ribs serve to guide the disc by its peripheral edges into a semicircular grooved portion of the insert. This grooved portion is comprised of an arcuate seat member, which forms the front wall of the groove, and the base of the insert, a portion of which is cut away so as to form a flexible flap, which defines the rear wall of the groove. The space between the seat member and the cut away base portion is sufficient to accept and secure a peripheral edge of the disc.

At least one spacer button is located upon a front face (i.e., that side which faces the disc) of the insert in the vicinity of the cut-away portion of the flexible flap formed by the base of the insert. In addition, several projecting members, molded integrally with a rear surface of the semicircular seat member, serve a function similar to that of the spacer button. That is to say that these projecting members serve to maintain a minimal degree of separation between the seat member and the flexible flap formed by the base of the insert. This prevents a rough edge along the periphery of either of the said surfaces from scratching or otherwise damaging the information-bearing surface of the disc when it is placed into or removed from applicants' storage cassette.

The insert utilized with embodiment B is molded with a slight curvature to achieve a removably secure fit within the housing. As this curved insert is received within the outer housing, a pair of parallel tab members, extending perpendicularly from the front face of the base portion on each side of the disc, is forced downwardly upon contact with an inner surface of the closure member. The force thus exerted upon these tabs serves to decrease the curvature in the insert. As the insert flattens out, a frictional fit is created between the insert and the outer housing which maintains the insert in position, even in the event the package is turned upside down.

As an adjunct to the frictional fit described above, a pair of flexible tabs are located along the bottom edges of the lateral side walls of insert B. Each such tab is configured with a horizontal notched portion which is adapted for an interlocking fit with a ridge member formed integrally with the corresponding lateral side walls of the package housing.

The insert of embodiment B is additionally provided with a pair of vertically parallel channel portions spaced inwardly from both outer side edges. These channel portions are configured to accept a corresponding pair of ramp members integrally formed on the inner surface of the rear face of the housing This arrangement permits the insert to be pulled approximately half way out of the housing, i.e., up until the ramp members reach the terminus of the channel portions, by grasping the serrated front surface of the integrally formed handle portion. This action permits access to the upper half of the disc. The handle is provided with a serrated surface to facilitate a secure grip and thus to ensure a smooth, steady pull upon the insert as the package is opened.

As described above with respect to embodiment A, the front face of the insert is provided with a parallel pair of vertical rib members located between each channel portion and a corresponding parallel tab member, utilized for reducing the curvature of the unflexed insert. The purpose of the vertical ribs is to guide the edges of the coded disc into a grooved portion of the insert formed, at the front face, by an arcuately configured seat member and, at a rear face, by the base portion of the insert. As before, a semicircular portion of the insert base, located adjacent the upper edge of the seat member, is cut away to permit the disc to slide behind the seat member within the groove. A spacer button, located upon the front face of the insert base and projecting members which are integrally molded upon a rear surface of the seat member, serve to provide a minimum degree of separation between the members forming the groove and to prevent the sharp edges of these members from damaging the surface of the disc.

A rear surface of the insert is corrugated in the zone of the open channel portions. This permits the curved portion of the insert to be molded with an enhanced degree of flexibility without the need to make the insert thicker to compensate for any loss in strength due to the cut-out portions. Any such increase in thickness would have a negative effect upon the performance of the subject insert since the tolerances between the disc and the accompanying booklet and liner notes is limited.

The insert of embodiment C includes additional features to achieve the same results as embodiments A or B. When this insert is pulled forward, i.e., out of the mouth of its accompanying housing, an upper portion comprising approximately ½ of the insert, drops downwardly out of the way at an angle of about 30–45 degrees. This downward rotation is made possible by connecting the two portions of the insert with a flexible "living hinge". As the upper portion of the insert drops out of the way, the top half of the stored disc is exposed.

In order to ensure that the information-bearing surface of the disc is not caused to ride across any sharp, potentially damaging surfaces, the lower semicircular "disc capturing" portion of the insert is configured in the shape of a very shallow cone or funnel. The upper and lower halves of the insert are coplanar when the package is closed thus providing a secure support for the entire disc surface.

This structural arrangement may therefore be analogized to the act of inserting a coin into a funnel wherein, no matter how the coin is manipulated, only the edges of the coin or, in the present case, the coded disc, ever touch the surface of the insert. When the disc is seated on the lower half of the insert, the edges pass over a flat plateau located around the periphery of this "disc capturing" surface, which provides additional support for the uncoded portion of the disc during storage. The arrangement described herein prevents any damage to the disc which may cause loss of the information contained thereon.

Embodiment C of applicants' invention is also provided with registration means to ensure that the insert is reproducibly seated within the housing at a location which will not interfere with that of the enclosed promotional booklet described above. The insert is provided with a pair of notched areas in its base portion which correspond to members projecting from the inner surface of the housing base. As the base of the insert approaches the base of the housing, the projecting members are captured within the notched portions and the insert is therefore correctly positioned.

Further, to prevent the entire insert from being completely withdrawn from the housing, the insert is provided on its lower lateral edges with flexible tab members having rearwardly projecting finger members. These finger members are configured to catch upon raised ribs which, as described above, are integrally molded upon the inner surface of the rear planar wall of the housing. In effect, therefore, the flexible tabs permit the insert to pass downwardly (i.e., by compressing inwardly during assembly of the package) but not upwardly past a particular point.

Insert D, while similar in many respects to insert C, comprises a number of features which distinguish this embodiment from insert C, as well as inserts A and B, described above. For example, embodiment C utilizes an entirely new capturing mechanism for retaining the insert portion thereof within the housing. This arrangement comprises a pair of parallel channels extending vertically along the rear face of insert D. Both channels are provided, upon a lower, i.e., inner, portion of the insert, with a sloping ramp member extending substantially perpendicularly from the insert within the channel. These ramps are configured for passage over corresponding ramp members extending perpendicularly inwardly from the rear face of the package housing.

Subsequently, as the insert is slid still further into the housing, a second pair of projecting members, located upon the upper rear face of insert D, in vertical alignment with the ramps on the lower portion of the insert, are passed over the ramps on the rear wall of the housing, thus seating a pair of notches defined by the base portion of the insert upon a pair of projecting members which extend upwardly from the base of the housing. When the package is opened, the user must generate sufficient force to overcome the interference fit between the ramps on the rear surface of the housing and the projecting members on the rear of the insert. These projecting members are provided with rounded surfaces to facilitate their movement past, i.e., upwardly or downwardly, the ramps on the housing. After clearing the ramps on the housing, insert D may be withdrawn from the outer housing to a point where a flat, upper surface of the ramps on the lower rear portion of the insert contacts the lower perpendicular surface of the ramps on the housing. This effectively prevents any further outward movement by the insert unless sufficient force is generated to break off one or both sets of ramps. There is thus no necessity for the use of flexible tabs having projecting members such as those utilized with embodiment C and these tabs, together with the corresponding ridges located in the interior of the housing in C, are not present in this embodiment.

Moreover, on the inner aspect of the closure portion of the package housing, a pair of longitudinally oriented "¼-cone" members, each having a rounded outer face, are positioned parallel to and slightly below the upper edge of the closure. These conical extensions form an elongated diamond-shaped aperture between the insert and the inner surface of the closure when the insert is pulled out to receive the disc so that, in moving the disc into or out of the package, the chance of any portion thereof being dragged across a sharp edge on the package and thus damaging or destroying the usefulness of the disc is significantly reduced. In effect, the space which is defined between the ¼ cone members and the insert resembles a shallow funnel wherein only an uncoded edge portion of the disc ever actually touches the surface of the package.

Further, upon an arcuate seat member (which forms a portion of the disc capturing ring) located upon the front face of the inner portion of the insert, two rounded members extend upwardly. These members serve to support a lower half of a booklet, normally included within the package, above the disc and to prevent it from dragging across the surface of the disc as the insert is moved, which may both damage the disc and wrinkle the booklet.

Moreover, on an upper front face of the insert, i.e., above the living hinge, a second set of parallel ribs extends perpendicularly outwardly from the insert to support the top half of the booklet. This second set of ribs is located inwardly from the primary pair, which are positioned along each peripheral edge on the front face of the insert. In addition, the second, inner set of ribs is shorter than the outer set to take into account the curvature of a raised semicircular ridge upon which the upper circumferential edge of the disc rests in the storage position.

Still further, along the upper portion of the outer peripheral edges of the disc capturing ring, a pair of elongated finger members, not attached to the surrounding side walls, float freely to facilitate the insertion of both the disc and the booklet into their appropriate slots. A further advantage of the flexibility of these elongated fingers is that they may be used with booklets having a variety of thicknesses. Thus, they facilitate the insertion and/or withdrawal from the package of both the disc and the booklet To further assist in correctly positioning the booklet, the pair of protruding members extending perpendicularly upwardly from the inner surface of the base of the housing, previously discussed with regard to the capturing system for retaining the insert within the housing, also serve a secondary function. Their free surfaces, i.e., that edge not abutting the rear wall of the insert, are rounded to permit the booklet to slide smoothly thereover when it is inserted in the package, thus preventing damage to the booklet and ensuring that the booklet enters its proper space between the disc capturing ring and the closure of the housing.

Various alternate embodiments of applicants' insert are, of course, possible as discussed above. For example, insert B which is molded having a slight degree of curvature to ensure a frictional fit within the outer housing, may be molded with features similar to those of embodiment C, e.g., wherein a lower, semicircular "disc capturing" portion of the insert is configured to have a shallow cone or funnel shape. A flat shelf portion may be located along the periphery of the groove to provide additional support for an uncoded portion of the disc. Further, flexible tab members located at a terminal bottom portion of each lateral side wall of the insert can be provided with projecting members configured and adapted to catch upon raised ribs integrally molded upon an inner portion of the rear longitudinal wall of the housing. A base portion of the insert may be constructed with notched segments corresponding to upwardly projecting members extending from the base of the housing, such as those appearing in embodiment C. This arrangement is provided to properly seat the booklet within the housing. In a still further embodiment, the insert of embodiment A may be provided with the features of embodiment C, described above with regard to embodiment B.

BRIEF DESCRIPTION OF THE DRAWINGS

FIG. 2 is a top plan view of embodiment A as depicted in FIG. 1, assembled;

FIG. 3 is a sectional view taken along the line 3—3 of FIG. 2;

FIG. 4 is a partial sectional view taken along the line 4—4 of FIG. 2;

FIG. 5 is a partial sectional view taken along the line 5—5 of FIG. 3;

FIG. 6 is a partial sectional view taken along the line 6—6 of FIG. 5;

FIG. 7 is a partial sectional view taken along the line 7—7 of FIG. 5;

FIG. 8 is a partial sectional view taken along the line 8—8 of FIG. 5;

FIG. 9 is a sectional view, partially broken away, of the insert of embodiment A in an opened position;

FIG. 10 is an exploded perspective view of a second embodiment, B, of the present invention;

FIG. 11 is a top plan view of the embodiment depicted in FIG. 10, assembled;

FIG. 12 is a sectional view taken along the line 12—12 of FIG. 11;

FIG. 13 is a partial sectional view taken along the line 13—13 of FIG. 12;

FIG. 14 is a partial sectional view taken along the line 14—14 of FIG. 13;

FIG. 15 is a partial sectional view taken along the line 15—15 of FIG. 13;

FIG. 16 is a partial sectional view taken along the line 16—16 of FIG. 13;

FIG. 17 is a partial sectional view taken along the line 17—17 of FIG. 13;

FIG. 18 is a partial sectional view taken along the line 18—18 of FIG. 19;

FIG. 19 is a sectional view, partially broken away of embodiment B in an opened position;

FIG. 21 is a top plan view of the embodiment depicted in FIG. 20, assembled;

FIG. 22 is a sectional view taken along the line 22—22 of FIG. 21;

FIG. 23 is a partial sectional view taken along the line 23—23 of FIG. 22;

FIG. 24 is a partial sectional view taken along the line 24—24 of FIG. 23;

FIG. 25 is a partial sectional view taken along the line 25—25 of FIG. 23;

FIG. 26 is a partial sectional view taken along the line 26—26 of FIG. 23;

FIG. 27 is a sectional view, partially broken away, of the insert of embodiment C in the opened position;

FIG. 28 is a partial sectional view taken along the line 28—28 of FIG. 27;

FIG. 29 is a partial sectional view taken along the line 28—28 of FIG. 27;

FIG. 30 is an exploded perspective view of a fourth embodiment, D, of the present invention;

FIG. 31 is a fragmentary view taken along the edge of the hinged insert of embodiment D in FIG. 30; and FIG. 32 is a partial sectional view taken along the line 32—32 of FIG. 30;

FIG. 33 is a fragmentary rear view of the insert of FIG. 30, depicting the area on the lower portion of the insert illustrated in phantom in FIG. 30; and FIG. 34 is a partial sectional view taken along the line 34—34 of FIG. 33.

DETAILED DESCRIPTION OF THE PREFERRED EMBODIMENTS

Figure 1:
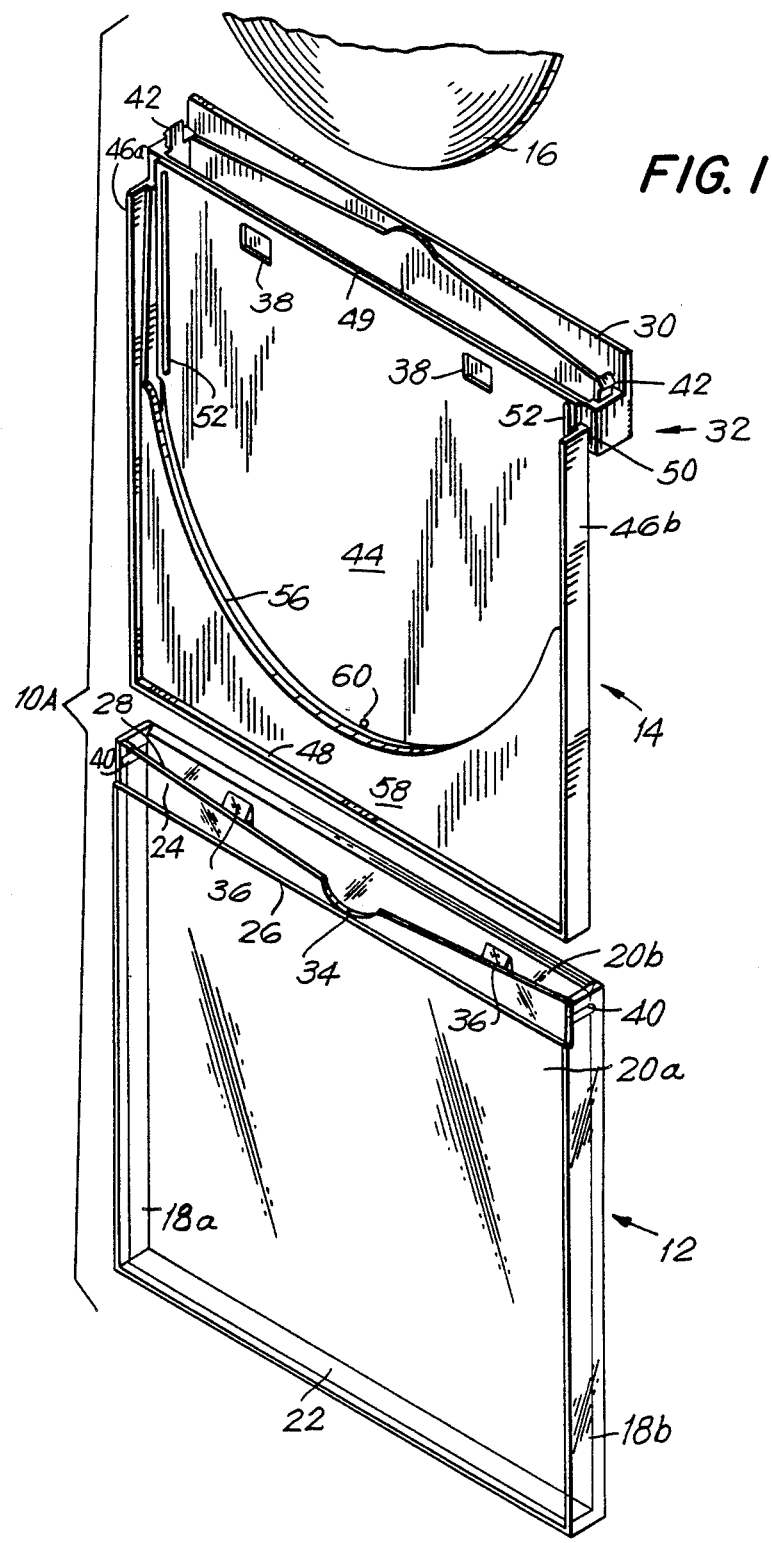
FIG. 1 is an exploded perspective view of a first embodiment, A, of the disc storage package of the present invention.

Referring initially to FIG. 1, there is illustrated a first embodiment (A) of applicants' novel disc storage package 10. Package 10 comprises an outer plastic housing 12 within which is slideably engaged an insertable drawer member 14 (hereinafter called the "insert") configured for holding disc 16. Housing 12 is preferably molded of a non-pigmented thermoplastic composition to permit the retail customer to visually observe the contents of package 10.

Housing 12, formed, as described above, of a molded thermoplastic, e.g., polystyrene, is constructed with two pairs of oppositely disposed side members 18a, 18b, 20a, 20b which are co-joined at bottom member 22. Front face 20a, hereafter referred to as the "closure", is separately molded from the remainder of housing 12 and is preferably secured thereto by a process such as solvent welding or ultrasonic bonding.

Closure 20a is provided with a recessed portion 24 on its upper surface 24, having a thickness relatively less than that of the remaining portion of closure 20a. Recessed portion 24 extends from ridge 26 to upper edge 28 of housing 12 and serves as a seat to receive front face 30 of lid 32. Lid 32 is formed integrally with insert 14 in a manner to permit flexing or bending along a hinge 49. Further, upper edge 28 of closure 20a is provided with a V-shaped profile which permits disc 16 to be inserted into housing 12 at an angle. Thus, the only portion of disc 16 which touches housing 12 is the margin or edge of the disc which does not contain any audio or visual data. Inserting disc 16 in this manner prevents the information-bearing surface thereof from riding or scraping across housing 12.

An eliptical cut-out along edge 28 makes it easier for the user's fingers to grip disc 16 when lid 32 of insert 14 is opened. Additionally, this cut-out permits access to peripheral printed material included with disc 16, such as a booklet containing explanatory information concerning the audio or optical data contained on the disc. The front face 30 of lid 32 is configured to match the contour of upper edge 28 in order to provide a smooth surface when closed.

Rear face 20b of housing 12 is provided on an upper surface with ramps 36 extending into the interior of housing 12, which are configured for slideable engagement with windows 38 in insert 14. An interlocking engagement between ramps 36 and corresponding windows 38 prevents insert 14 from sliding out of housing 12 during the removal of disc 16 or in the event that the package is turned upside down.

Additionally, side walls 18a, b of housing 12 are provided with notched portions 40 on the upper interior surface thereof for an interlocking engagement with tabs 42 molded integral with and extending perpendicularly from lid 32 of insert 14. In combination, therefore, the frictional fit between front face 30 of lid 32 and recessed portion 24 of closure 20a, together with the interlocking engagement of tabs 42 within notched portions 40, serves to maintain package 10 in a closed condition unless intentionally opened by the user.

Insert 14 is molded of a polyolefinic thermoplastic composition, such as, preferably, polypropylene. The insert is tray-shaped and preferably comprises base 44 defined by a pair of oppositely disposed parallel side walls 46a, b and bottom wall 48. An upper portion of base 44 comprises lid 32 which is attached to the base portion by flexible hinge means 49 such as, preferably, a "living hinge" arrangement. By "living hinge" applicants mean a thin, flexible, integrally molded portion of insert 14 connecting lid 32 and base 44. This "living hinge" permits lid 32 to be rotated through any desired angle up to about 120°, i.e., until a rear face 50 of lid 32 contacts longitudinal wall 20b of housing 12, so as to permit package 10 to be opened and disc 16 or any peripheral printed material located therein to be removed.

Insert 14 further comprises parallel ribs 52, extending perpendicularly to the surface of base portion 44. The purpose of ribs 52 is to guide the peripheral edges of disc 16 into a semicircular groove 56 defined at the rear by base 44 and at the front by molded seat member 58. A corresponding semicircular portion of base 44 adjacent seat member 58 is cut away so as to permit disc 16 to slip in between base 44 and seat member 58 within groove 56. Insert 14 is further provided with a molded spacer button 60 which serves to maintain a slight separation between disc 16 and the flexible cut-out portion of base 44. The purpose of spacer button 60 is to prevent the sharp edge along the periphery of the cut-out portion of base 44 from scratching the information-bearing surface of disc 16 when it is inserted or removed from groove 56.

If not for the presence of ribs 52, disc 16 might slide outside of groove 56, i.e., between seat member 58 and closure 20a, thus taking up space intended for a promotional booklet (not shown). Such booklets are commonly enclosed with discs 16 of the type envisaged and they may contain, for example, song titles or bibliographic information about the artist in the case of audio CDs.

Turning now to FIG. 2 there is illustrated upper plan surface 62 of lid 32. As noted above, lid 32 is formed integrally with base 44 of insert 14 and is flexibly attached thereto by living hinge 49.

FIG. 3 is a sectional view taken through the entire package 10. In addition to disc 16, package 10 includes various printed materials such as liner notes 64 and booklet 66 which may contain promotional text, such as song titles and/or photographs of the artists whose work is contained on disc 16.

Viewing FIG. 3 from left to right, there is illustrated closure 20a, i.e., the front face of housing 12; followed by booklet 66 which is guided by side walls 46a, b of insert 14 to a position between closure 20a and disc 16; seat member 58 which, together with a semicircular cut-out on base 44, forms groove 56 for seating disc 16 therein. The friction generated between the flexible cut-out portion of base 44 and seat member 58 ensures a secure grip upon disc 16, even in the event that package 10 is shaken or turned upside down.

Continuing from left to right, there is illustrated disc 16, base 44 of insert 14, liner notes 64 and rear wall 20b of housing 12. As noted above, but which is illustrated more clearly in FIG. 3, spacer button 60 serves to position the flexible cut-out portion of base 44 away from the surface of disc 16 to prevent the sharp molded edge located thereon from scratching the surface of the disc.

Several features of the invention which are clearly observable in FIG. 3 include an interlocking fit between ramps 36 which are integrally molded on housing 12 and corresponding windows 38 in insert 14. Each ramp 36 is inclined downwardly to facilitate the slideable insertion of insert 14 into housing 12. These members, i.e., ramps 36, thereafter prohibit insert 14 from being pulled out of housing 12 when either disc 16 or booklet 66 is removed from package 10. Although rectangular ramps 36 and corresponding windows 38 are the preferred embodiment of the invention, other shapes may work as well or, as described below with relation to FIG. 10, windows 38 may be replaced by grooved channels permitting insert 14 to slide to a limited degree within housing 12 but which would prevent it from being pulled completely out.

Additionally, front face 30 of lid 32 is provided with a series of serrations or corrugations 68 molded into the plastic which provide a convenient no-slip gripping surface for the user. This roughened surface may be readily felt by those who use the product in a low-light environment or whose visual acuity may be deficient.

FIG. 4 is an exploded view of the interlocking fit between tabs 42 extending perpendicularly from lid 32 and a notched portion 40 on the interior of lateral side wall 18a of housing 12. This fit maintains lid 32 in a closed position until such time as the user employs sufficient force to overcome the engagement between housing 12 and lid 32 so as to permit the removal of disc 16 from package 10.

FIG. 5 is a partial rear view of insert 14 illustrating the features thereof. Base 44 contains, on its rear surface, a grooved portion 70 extending downwardly from window 38, which has a reduced thickness over that of the remainder of insert 14, but which does not extend entirely through insert 14. Grooved portion 70 facilitates the passage thereof over ramps 36. Corresponding to said grooved portion 70 is groove 72 in rear support member 74 which serves a similar purpose when insert 18 is placed within housing 12. Rib 52, one of a pair of ribs 52 located on the front face of insert 14 for guiding disc 16 into position in groove 56, is shown in phantom.

Further, a series of projecting members 76 are molded integrally with the rear surface of seat member 58, extending parallel thereto. Members 76 serve the same purpose as spacer button 60 in that they maintain a minimal degree of separation between the surface of disc 16 and seat member 58. Such a separation prevents the information-bearing surface of disc 14 from being scratched upon insertion into or removal from insert 14 due to the frictional engagement of disc 16 within groove 56.

FIG. 6 is a close-up view of the interengagement between a corresponding ramp 36 and window 38. Each ramp 36 is molded integrally with wall 20b of housing 12 and extends into the interior of housing 12. Each ramp 36 extends into a window 38 so as to prevent insert 14 from being drawn out of housing 12 together with disc 16 or booklet 66 when either or both is removed from package 10.

FIG. 7 is a sectional view taken through one of a pair of ribs 52, which are useful in guiding disc 16 into groove 56. From top to bottom, i.e., back to front, this view comprises rear planar wall 20b of housing 12, liner notes 64, base portion 44 of insert 14, having molded thereupon rib 52 for guiding disc 16 within said insert 14, disc 16, booklet 66 and finally closure member 20a. As noted above, ribs 52 serve by their presence to prevent disc 16 from sliding downwardly into a position between seat member 58 and booklet 66, thus missing the intended target, i.e., groove 56.

FIG. 8 is a sectional view taken through one of members 76 which illustrates the insertion of disc 16 between seat member 58 and a flexible portion of base 44. Members 76 thus serve to keep disc 16 from dragging across edge 78 of seat member 58 during insertion or removal of the disc so as to prevent damage to the information-bearing surface thereof.

FIG. 9 illustrates an alternate embodiment wherein ramps 36 are not engaged within windows 38. Rather in this embodiment, insert 14 may be withdrawn from housing 12 to a distance such that only its horizontal base member 48 is maintained within housing 12, i.e., by the engagement of base member 48 by ramps 36. This arrangement permits simplified access to booklet 66 and/or disc 16.

The previously described embodiment, i.e., wherein ramps 36 interlock with windows 38, is preferred, however, since, in the alternate form described above, insert 14 may be easily bent or broken, or one or both of ramps 36 may be snapped off due to an excessive amount of force being utilized in opening package 10. Interlocking ramps and windows avoid either type of damage.

Additionally, FIG. 9 illustrates the presence of a small space 78 located between front face 30 of lid 32 and the main body portion thereof. Wherein, as illustrated, body portion 31 is inserted into the open end of housing 12, face 30 is positioned exterior to closure 20a, covering recessed portion 24 and sealing thereover with a frictional fit.

Turning now to FIG. 10 there is illustrated a second embodiment (B) of applicants' disc storage package 10. Due to the similarities between embodiments A and B, features of both packages which are identical or which have the same function have been given the same numerical designation.

In the subject embodiment (B), insert 14 is molded with a slight degree of curvature, and is maintained within housing 12 due to a combination of: (1) a friction fit created between the insert and housing 12 when insert 14 is flattened to facilitate its passage into the housing, and (2) an interlocking engagement between notched portions 78 on lateral side walls 46a, b of insert 14 and raised ridges 80 located on corresponding lateral side walls 18a, b of housing 12. The lower portions of side walls 46 a, b, i.e., below notches 78, are flexible to permit tabs 79 to squeeze inwardly past ridges 80 upon insertion of insert 14 into housing 12.

Ramps 36, integrally molded upon an inner surface of rear wall 20b forming a portion of housing 12, serve the same purpose as in embodiment A. In this embodiment, however, windows 38 have been replaced by grooves 38′ which permit insert 14 to be at least partially withdrawn from housing 12, that is, up until the curved portion of insert 14 reaches upper edge 28 of housing 12. As described above, i.e., in relation to embodiment A of package 10, edge 28 has been molded to have a V-shaped profile with gently sloping sides in order to facilitate the passage of disc 16 across the top of closure 20a and down into groove 56 in insert 14. This V-shape is important in that it ensures that edge 28 of housing 12 contacts only the non-information bearing portion of disc 16 when the disc is inserted into or removed from package 10. Lid 32 is profiled in a corresponding manner and is molded to correspond to the configuration of edge 28 such that serrated portion 68 abuts against upper edge 28 of closure 20a when package 10 is completely shut.

Insert 14 is further provided with two pairs of parallel shelf members 82. Members 82 are integrally molded with lid 32 and serve to support booklet 66 (not shown) above disc 16. Further, tabs 84, extending perpendicularly from a front face of base 44 on insert 14, are provided along both side portions of the insert to force the bent portion of insert 14 to lie flat within housing 12 so as to create a frictional engagement between insert 14 and housing 12. Tabs 84 also serve a second function, that is to maintain booklet 66 in position. The preferred position for booklet 66 is in front of disc 16, between closure 20a and seat member 58. Further, as previously described with regard to applicants' embodiment A, raised ridges 52 are provided on base 44 of insert 14 to guide disc 16 into groove 56.

FIG. 11 illustrates the upper plan surface 62 of lid 32 in the same manner as FIG. 2. However, whereas lid 32 is formed integrally with the remainder of insert 14, it does not include the flexible hinge in the manner of embodiment A. Rather, as described above, the package 10 is closed by sliding the curved insertable drawer member 14 downwardly into housing 12 so as to straighten out the curve in insert 14 until the front face of lid 32 abuts against upper edge 28 of closure 20.

FIG. 12 is a sectional view taken lengthwise through embodiment B of applicants' package 10, which is similar to that previously illustrated in FIG. 3. Viewing FIG. 12 from left to right there is illustrated closure 20a, i.e., the front face of housing 12; followed by booklet 66 located between closure 20a and disc 16; and seat member 58 which, when taken together with a semicircular cut-out on base 44, forms groove 56 for seating disc 16 therein. As explained with reference to FIG. 3, the friction between the flexible cut-out portion of base 44 and seat member 58 creates a secure grip upon disc 16, even in the event that package 10 is shaken or turned upside down. Continuing, from left to right, there is shown disc 16, base portion 44 of insert 14, liner notes 64 and the rear planar surface 20b of housing 12.

The lines designated as 86 are indicative of a corrugated surface molded into the rear face of insert 14. Corrugations 86 serve to strengthen the molded plastic insert 14 without increasing the thickness thereof. Ramps 36 extend into grooves 38' in the corrugated portion of base 44 and slide therein as insert 14 is moved either upwardly or downwardly.

Turning now to FIG. 13 there is illustrated a partial rear view of insert 14 for use in embodiment B of package 10. As described above, disc 16 is frictionally engaged in groove 56 wherein projecting members 76, together with spacer button 60 serve to create a gap wide enough to insert disc 16 but narrow enough to prevent an edge portion of disc 16 from becoming scratched by the edges of the groove.

At the base of insert 14, a flexible side tab 79 on wall 46b is molded with a horizontal grooved portion 78. Groove 78 is configured for accepting ridge 80 which is integrally molded upon lateral wall 18b of housing 12. This locking engagement, in conjunction with the friction fit created by straightening the arcuate portion of insert 14 within housing 12 (by downward pressure exerted upon tabs (84) serves to maintain the container in a closed position, even when it is turned upside down.

A corresponding arrangement is provided along the other parallel edge of insert 14.

In the subject embodiment (B), groove 38' extends completely through insert 14, from the front to the back face thereof. In addition, grooved portions 72 of support members 48 and 74, which are in alignment with grooves 38', facilitate the passage of the rear surface of insert 14 over ramps 36 upon its insertion into housing 12. Corrugations 86 have been molded into the rear face of the insert in order to strengthen it without rendering it thicker and therefor less flexible. As noted above, this form of construction permits insert 14 to be flattened out when downward pressure is exerted upon tabs 84 by sliding insert 14 into housing 12.

FIGS. 14-17 illustrate a number of sectional views taken through various portions of insert 14. For example, FIG. 14 is a view taken through groove 38, wherein ramp 36, integrally molded upon the inner surface of planar face 20b, extends into groove 38' to maintain insert 14 within housing 12.

FIG. 15 is a view taken through one of tabs 84. This view illustrates how a downward pressure exerted upon tabs 84 forces the curved portion of insert 14 to bend in a direction opposite the original angle of curvature and thus to assume a sufficiently straight configuration to enable it to slide into and out of housing 12 without binding.

FIG. 16 is a view taken through groove 56 illustrating the interposition of disc 16 between a flexible portion of base 44 and seat member 58 of insert 14 wherein seat member 58 is provided on a rear surface thereof with a series of molded members 76 extending perpendicularly from the surface thereof so as to create a minimal degree of space between base 44 and the seat member 58. The space thus created is at least sufficient for the insertion therein of at least an edge portion of disc 16.

FIG. 17 is a view through the center of groove 56, passing through seat member 58, disc 16 and the flexible portion of base 44 containing spacer button 60. Spacer button 60 is formed integrally with base 44, as shown in FIG. 1, while members 76 are molded upon a rear portion of seat member 58. Members 76 thus serve to maintain seat member 58 spaced apart from disc 16, i.e., the same function which is provided by spacer button 60.

FIG. 18 is a sectional view taken through FIG. 19. This view illustrates flexible tabs 79 located along the bottom portion of each lateral side wall 46a, b of insert 14. Flexible tabs 79 engage ridge 80 located on each side wall 18b of housing 12 at notched portion 78 (not shown), which is molded into the lateral side walls 18a, 18b of housing 14.

FIG. 19 depicts embodiment B of applicants' package 10 in an opened condition. From left to right, this view illustrates closure 20a, booklet 66, seat member 58, disc 16, base portion 44, liner notes 68 and rear longitudinal wall 20b of housing 12. The curvature of the unstressed insert 14 is clearly apparent in the subject drawing figure.

Figures 20, 20A:
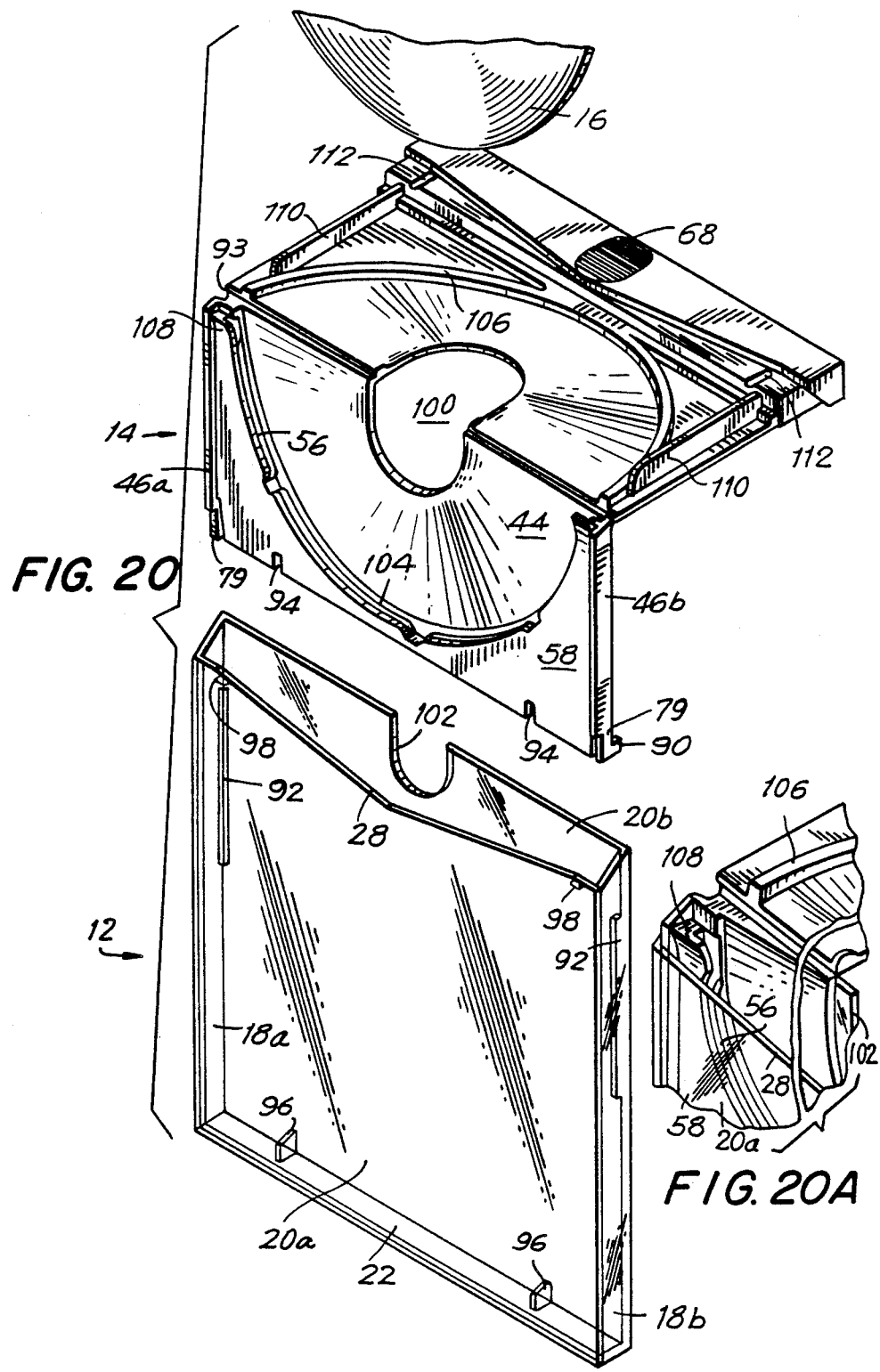
FIG. 20 is an exploded perspective view of a third embodiment, C, of the present invention.
FIG. 20A is a fragmentary view taken along the edge of the hinged insert of embodiment C.

FIG. 20 illustrates a further embodiment (C) of applicants' disc storage package 10. In view of the similarities between the subject embodiment and versions A and B, features which are identical to those previously described or which have the same function have been identified with the same numerical designation.

Embodiment C is designed to slide open using only the most obvious and natural movements, in a manner similar to that of embodiment B. Lid 32 is provided with a thumb-shaped area 68 which is serrated in a similar fashion to the lid 32 of embodiment B, as shown and described with regard to FIG. 10.

When insert 14 is initially slid into housing 12 during the assembly of package 10, flexible tabs 79 bearing integrally formed perpendicular extensions 90 are compressed inwardly toward the main body of insert 14 upon contact with each of a pair of raised parallel ridges 92 integrally molded upon an inner surface of rear planar wall 20b of housing 12. This permits tabs 79 to proceed past ridges 92 so as to allow a lower portion of insert 14, containing notches 94, to engage projecting members 96 which serve to orient insert 14 within housing 12. Projecting members 96 are formed integrally with bottom face 22 of housing 12 and abut the rear planar surface 20b thereof.

As insert 14 is pulled forward, in order to open package 10, the engagement between projecting members 96 and notches 94 is overcome and insert 14 slides outwardly until perpendicular extensions 90 upon flexible tabs 79 catch upon ridges 92, which prevents any further forward motion.

As insert 14 slides forward, it carries with it booklet 66 (not shown) which accompanies insert 14 along its path until the upper edge of booklet 66 is arrested by projecting members 98 located upon the inner surface of closure 20a. This arrangement positions booklet 66 for grasping by the user if so desired.

In an alternate embodiment, members 98 may be extended to form raised ridges of up to about 1 inch in length and positioned horizontally on the inner surface of closure 20a. Thus, an overhead plan view of this arrangement presents the appearance of a shallow cone or funnel-shaped zone, similar to that created in the lower portion of the insert base, located between the inner surface of closure 20a and the front face of insert 14. This construction works in conjunction with V-shaped edge 28 of housing 12 to prevent disc 16 from being scratched or otherwise damaged when any portion thereof passes into an interior portion of housing 12.

When insert 14 reaches its point of maximum extension, i.e., when extensions 90 abut ridges 92, the outer half (i.e., that portion now outside of housing 12) of insert 14, which is attached to the inner half only by living hinge 93, drops downwardly to an angle of about 30 to 45 degrees. When this occurs, the outer half of disc 16 is exposed and may thus be grasped by the user.

Insert 14 is further provided with a centrally located aperture 100, a lower, ring-shaped portion of which corresponds to a cut-out portion 102 in rear planar wall 20b of housing 12. It is the intent of this design (i.e., embodiment C) to encourage the insertion of the user's finger through cut-out portion 102 as well as aperture 100 and thereafter through a central hole (not shown) in disc 16, following which the outer edge of disc 16 would naturally be grasped by the user's thumb to facilitate its removal from package 10.

Insert 14 has been designed as a tray with a grooved capturing ring 56 formed by base 44 and seat member 58 for grasping the lower circumferential edge portion of disc 16. This portion of insert 14 always remains within housing 12 and terminates at the area where living hinge 93 is molded.

The remaining portion of insert 14, which extends beyond housing 12, comprises a molded, ring-shaped plateau 106 which supports the upper circumferential edge portion of disc 16 when package 10 is closed. Both grooved capturing ring 56 and plateau 106 are co-planar when package 10 is closed (as may be more clearly seen in FIG. 20A) and neither touches disc 16 at any time at any point other than on the uncoded perimeter portion thereof.

This arrangement is due to the geometric orientation of these segments wherein the surface of base 44 in the vicinity of capturing ring 56 is molded in the shape of one-half of a very shallow inverted cone, Disc 16, when passing over this surface, rides only upon its edges. Only upon reaching a narrow perimeter shelf 104 does disc 16 seat between shelf 104 and the abutting narrow overhang Edge 28 of closure 20a serves a similar function to that of the upper closure edge in embodiments A and B in that its V-shaped profile guides disc 16 into grooved capturing ring 56 in a manner such that the information-bearing surface of disc 16 does not scrape across the rough surface of housing 12 during its insertion or removal from package 10.

Upper winged fingers 108 of capturing ring 56 (which are more easily viewed in the close-up view illustrated in FIG. 20A) are inclined outwardly i.e., toward closure 20a, to guide booklet 66 (not shown) into its proper position between seat member 58 and the interior surface of closure 20a. Booklet 66 is thus prevented from accidentally entering capturing ring 56, which is reserved for disc 16. Rib members 110 extending perpendicularly from an upper surface of flexible insert 14, also serve a function with respect to booklet 66. When the upper hinged portion of insert 14 is rotated upwardly toward the undersurface of disc 16, ribs 110 serve to support booklet 66 and prevent it from laying directly atop disc 16. Additionally, molded ridges on lid 32 serve to push booklet 66 back into housing 12 once package 10 has been opened to remove or replace disc 16.

FIG. 21 is similar to FIGS. 2 and 11 in that it illustrates upper plan surface 62 of lid 32. Lid 32, it should be noted, is formed as an integral part of insert 14.

FIG. 22 is a sectional view taken entirely through embodiment C of package 10. Viewing FIG. 22 from left to right, there is illustrated closure 20a, booklet 66, seat member 58, disc 16, conically profiled base 44, liner notes 64 and rear planar wall 20b of housing 12. The orientation of disc 16 upon insert 14 in embodiment C may be more easily understood from a review of FIG. 22. It is readily apparent from this illustration that no part of disc 16, other than its peripheral edge portions, is contacted by insert 14 when disc 16 is stored in package 10. This separation is indicated by a space 114 between the disc 16 and the insert 14, except at the peripheral edge of disc 16.

FIG. 23 is a partial rear view of insert 14 utilized with embodiment C, illustrating the features thereof. A peripheral edge portion of base 44 is attached to seat member 58 at a number of locations, preferably 3, spaced along the semicircular arc of capturing ring 56. This attachment is effected by molded members 116 which, extend outwardly from the periphery of base 44 and then upwardly at a substantially right angle to a rear surface of seat member 58. In the area between each attachment member 116 lies grooved ring 56 which is of a width sufficient to accept an edge portion of disc 16.

The rear surface of disc 16 is observable through aperture 100 in insert 14. To remove disc 16 from insert 14, the portion of insert 14 above hinge 93 may be rotated downwardly out of the way with the user then placing his finger through aperture 118 in disc 16. While grasping the edge of disc 16 with his thumb and forefinger, the user thus pulls the edge of disc 16 out of grooved ring 56.

FIG. 23 additionally illustrates the fit between notches 94 located in a base portion of insert 14, which engage members 96, projecting from base 22 of housing 12. This arrangement serves as registration means to correctly position booklet 66 within housing 12, between members 96 and closure 20a when package 10 is closed. The figure further discloses flexible tabs 79 having projections 90 for maintaining insert 14 at least partially within housing 12 by catching on raised ribs 92.

FIG. 24 is a sectional view through projecting member 98 located on the inner face of closure 20a, shown in phantom in FIG. 23. Member 98 abuts against a recessed portion of lid 32 when package 10 is closed.

FIG. 25 is a sectional view taken through one of attachment members 116 illustrating the means by which base 44 is attached to seat member 58 so as to form grooved capturing ring 56. Ring 56 is of sufficient width to accept a peripheral edge of disc 16.

FIG. 26 is a sectional view through a notch 94 in the base of insert 14 and a corresponding projecting member 96 extending from bottom member 22 of housing 12. Members 96, whose rear surface abuts against planar wall 20b, additionally ensure, as noted with regard to the discussion of FIG. 23, that booklet 66 slides down the inclined surface thereof to rest in its proper location, i.e., against the inner surface of closure 20a.

FIG. 27 depicts embodiment C of applicants' package 10. From left to right, this view illustrates closure 20a, booklet 66, seat member 58, disc 16 and base 44 of insert 14, a lower portion of which is molded with a funnel-shaped configuration, having an upper portion which may be rearwardly rotated through an arc around living hinge 93. The subject drawing figure additionally illustrates the process by which extension 90 on flexible tab 79 catches upon raised ridge 92 to prevent insert 14 from being drawn out of housing 12 past the point where hinge 93 is approximately level with the mouth of housing 12.

FIG. 28 is a sectional view through package 10 illustrating a flexible tab 79 having, on a terminal portion thereof, a projecting member 90 whose purpose is to catch on ridge 92 (see FIG. 27) to prevent insert 14 from being pulled completely out of housing 12. An inclined gap 88 between flexible tab 79 and the body portion of insert 14 permits tab 79 to flex inwardly so as to bypass ridge 92 when insert 14 is originally slid within housing 12.

FIG. 29 is a sectional view through package 10 taken through a higher plane than that depicted in FIG. 28. This view is included to illustrate the engagement between a flexible tab 79 and one of ridges 92.

FIGS. 30-34 illustrate a further embodiment (D) of applicants' disc storage package 10. Although this embodiment comprises a variety of features which distinguish it from embodiments A-C discussed above, it still retains a number of features in common with these embodiments, i.e., mainly with embodiment C. Thus, the same numerical designation has been applied to features which are identical or which serve the same purpose in the present embodiment D as in embodiments A-C.

Embodiment D is designed to slide open using only the most obvious and natural movements, in the manner of embodiment C. For this purpose, lid 32 is provided with a thumb-shaped area 68 on its front face which is serrated in a manner similar to lid 32 of embodiment C as described with respect to FIG. 20.

One major difference between the present embodiment and that designated as "C" (i.e., FIGS. 20-29) lies in the mode by which insert 14 is captured within housing 12. As insert 14 is initially slid into housing 12 during its initial assembly, a pair of sloping ramps 116 (shown in phantom) located in shallow grooved channels 118 on the rear face of insert 14 contact a corresponding pair of ramp members protruding inwardly from a rear wall 20b of housing 12. Channels 118, which are flush with the front face of insert 14 on the lower, i.e., inner, portion thereof, are raised on the upper, i.e., outer, portion of insert 14 (i.e., that portion above the living hinge), to form ridges 119 on the front face, i.e., the side facing disc 16, of insert 14.

Ramps 116 are configured and adapted to slide over ramps 120, thereby permitting the insert to slide further into housing 12. Then, as the lower planar surface 122 of insert 14 contacts the corresponding "floor" portion 22 of housing 12, notches 94, defined by surface 122 of insert 14, capture projecting members 96 formed integrally with bottom face 22 of housing 12. This serves to orient the insert within the housing. In contrast to embodiment C, however, the front face of members 96 are rounded, to prevent damage to a booklet 66 (not shown), normally packed with disc 16, as insert 14 is pulled out or pushed in to housing 12 respectively, to open or close package 10.

Moreover, as insert 14 is directed downwardly toward the bottom of housing 12, a second pair of projecting members 124 (not shown) are slid past ramps 120 such that an upper surface of members 124 abuts a lower surface of ramps 120 when insert 14 is firmly seated within housing 12. These members 124 extend perpendicularly outwardly from the rear face of insert 14 and are vertically aligned with corresponding ramps 116, which are positioned within the parallel channels 118 on the top portion of insert 14, i.e., above the living hinge.

Projecting members 124 are slightly rounded upon their outer aspect so that package 10 may be opened with the exertion of a minimal force by the user to overcome the interference fit between members 124 and ramps 116. When the engagement between members 120 and 124 has been overcome, insert 14 may be pulled out of housing 12 up to the point where the flat upper surface of ramps 116 on the rear surface thereof are caught and held by the flat lower surface of ramps 120 on rear wall 20b of housing 12. Conversely, package 10 may be snapped shut by moving these parts in the opposite direction. Moreover, ramps 120 serve not only to keep at least a lower portion of insert 14 within housing 12, but they also retain the printed liner notes 64, included with certain applications of package 10, in position as well.

A further distinction between the present embodiment D and that designated as C is the replacement of inwardly projecting members 98 on closure 20a of embodiment C with horizontal rib members 124 extending inwardly toward disc 16 and configured in the shape of ¼ cones. Rib members 124 serve several functions, foremost of which is the creation of a shallow, elongated diamond-shaped aperture, formed between the lower portion of insert 14 and the inner surface of closure 20a, which facilitates removal and insertion of disc 16 from or onto, respectively, insert 14 within housing 12.

The above-described diamond-shaped configuration serves, in conjunction with V-shaped edge 28 of housing 12, to prevent any portion of disc 16 from being scratched or damaged when passing into an inner portion of housing 12. In addition, the rounded outer surface of quarter cone members 124 permits the V-shaped declivity on edge 28 of closure 20a to be shallower than that utilized with embodiment C, while still fulfilling its intended function. Rib members 124 also serve to maintain booklet 66 (not shown) within housing 12 when disc 16 is removed. Moreover, to facilitate the removal of disc 16 from insert 14, a semicircular groove 126 is formed in upper edge 28 of closure 20a, corresponding to groove 102 in rear wall 20b of housing 12. This arrangement permits the user to insert a finger through either groove 102,126 and into aperture 100 in the center of disc 16 from either side of package 10 and to lift the disc directly out without dragging the coded surface across any sharp portion of housing 12.

Further, with regard to the insert itself, upper winged fingers 108 of capturing ring 56 are, in contrast to embodiment C, allowed to float freely and are thus not formed integrally with side walls 46a and 46b, respectively. In addition, side walls 46a, b are beveled back away from fingers 108 so as not to interfere with the movement of the fingers. This arrangement has a number of advantages, including the fact that, by providing an upwardly curving set of flexible fingers 108, applicants facilitate the insertion into package 10 of a booklet 66 having a variety of widths and thicknesses. Thus, package 10 may be used to hold a music CD including a booklet containing an artist biography and/or song titles, as well as a CD-ROM, wherein the background information accompanying the disc would likely be much more voluminous.

In addition, winged fingers 108 readily discriminate between disc 16 and booklet 66 in that disc 16 is naturally directed into capturing ring 56 while booklet 66 slides over the fingers and down into the space between closure 20a and projecting members 96. As noted above, members 96 are rounded upon their free, i.e., outer, edge to prevent damage to booklet 66 as it is moved in or out of package 10. Thus, there is no hinderance to the free movement of either booklet 66 or disc 16 into their respective positions in package 10. Still further, a pair of raised button members 128 is provided upon the surface of arcuate seat member 58 to provide additional upward support for booklet 66.

On the upper front face portion of insert 14, i.e., above living hinge 93, there are, as noted above, a pair of parallel raised ridges 119, which form the rear boundary of the channels 118 on that portion of insert 14. Each ridge 119 extends from hinge 93 to lid portion 32 of insert 14. In addition, in contrast to embodiment C, there is a second set of parallel rib members 130 extending substantially perpendicularly from the front face of insert 14 and located some distance inwardly from outer ribs 110, toward the inner portion of the insert. Together with ribs 110 and button members 128, ribs 130 serve to support booklet 66 so that it does not lay directly atop disc 16 in package 10.

FIG. 31 provides a close-up view of the hinged portion of insert 14. This view is particularly useful in illustrating the orientation of flexible finger members 108 as they float at the periphery of capturing ring 56. As described above, members 108 serve a useful function in that they readily direct disc 16 into groove 56, and yet are sufficiently flexible to permit the insertion of booklets 66 having a variety of dimensions in the space between insert 14 and closure 20a. This illustration additionally depicts a portion of the conical or funnel-shaped zone formed between the lower portion of insert 14 and ¼ cone members 124 on closure 20a when the former is withdrawn from housing 12 a sufficient distance to permit the removal of disc 16.

FIG. 32 is a sectional view taken through closure member 20a and one of the ¼ cone members 124 projecting longitudinally therefrom. This view clearly illustrates the rounded outer surface of member 124 which is configured in this manner to prevent scratching or damage to the information bearing surface of disc 16 as it is passed thereover.

FIG. 33 provides a fragmentary rear view of the lower portion of applicants' insert 14. This view clearly illustrates one of shallow channels 118 (shown in phantom in FIG. 30) containing sloping ramp 116 and, on a corresponding upper portion of insert 14 (not shown) projecting members 124 (not shown). FIG. 34 provides a cross-sectional view through ramp 116 and living hinge 93 on the lower surface of insert 14.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

We claim:

1. An insertable drawer member configured and dimensioned for receiving and storing optically readable and recordable disc means within an outer housing in a manner so as to ensure that information hearing areas on said disc means are not damaged during insertion of removal therefrom, said insertable drawer member comprising:
   (a) a base portion divided into an upper half and a lower half by a living hinge located therebetween so as to permit downward rotation of said upper half from a first position, coplanar with said lower half, to a second position spaced a distance therefrom, said base portion further having, upon said lower half thereof, a semicircular groove, said groove configured and dimensioned for receiving said optically readable and recordable disc means by pressure-contact with non-information bearing areas of said disc means so as to releasably retain said disc means within said groove;
   (b) a lid integrally formed with said upper half of said base portion, said lid configured and dimensioned to include a V-shaped lower edge for contact relation with a corresponding V-shaped upper edge of said outer housing, which V-shaped housing edge ensures insertion and removal of said disc means in a manner which avoids damage to information-bearing areas thereof; and
   (c) retaining means for producing a pressure contact between said drawer member and an interior position of said housing, said retaining means comprising
      (1) at least one channel member located along a rear surface of said base portion, each said channel member oriented substantially perpendicularly to said living hinge;
      (2) a first projecting member extending within each said channel member on said lower half of said base portion, said first projecting member configured and adapted for non-reciprocal slidable passage over a corresponding member located upon an inner surface of said housing; and (3) a second projecting member corresponding to said first projecting member, said second projecting member extending from an inner surface of a rear wall of said housing at a location opposite and adjacent that of said first projecting member.

2. The insertable drawer member of claim 1 wherein said retaining means comprises two vertical channel members located on said rear surface of said base portion, said channel members aligned substantially parallel to one another and oriented substantially perpendicularly to said living hinge, both said channel members being of a sufficient depth along said upper half of said base portion to form a corresponding raised ridge on a reverse side of said channel along a front face of said base portion.

3. The insertable drawer member of claim 2 wherein said first and said second projecting members are ramp members, said first ramp member having a sloping lower surface and an upper surface extending substantially perpendicularly to said base portion, said second member having a sloping upper surface and a lower surface extending substantially perpendicularly to said rear surface of said housing so as to permit said drawer member to be inserted completely into said housing while ensuring that at least said lower half of said base portion remains therein when said disc means is accessed.

4. The insertable drawer member of claim 3 wherein said retaining means further comprises a projecting button member located within a portion of at least one of said channel members located upon the upper half of said base portion, each said button member configured for reciprocal movement across said second projecting member upon said housing and adapted for snap-locking engagement with said second projecting member to maintain said housing in a closed condition until intentionally opened to access said disc.

5. An insertable drawer member configured and dimensioned receiving and storing optically readable and recordable discs such as compact discs, CD-ROMs, video laserdiscs and the like within an outer housing in a manner which ensures that information bearing areas of said discs are not damaged during insertion or removal therefrom, said insertable drawer member comprising:

(a) a base at least partially defined by a pair of opposed parallel side walls, said base being divided into an upper portion and a lower portion by hinge means located therebetween to permit the downward rotation of said upper portion from a first position coplanar with said lower portion to a second position spaced a distance therefrom, said lower portion comprising an arcuately shaped seat member spaced a distance apart from a flat plate member, said seat member and said plate member forming a front face and a rear face, respectively, of a semicircular groove, wherein said groove is defined by the space therebetween, and further, a portion of said plate member forming a rear face of said groove being at least partially detached from a remaining portion of said plate portion, said semicircular groove additionally comprising at least one member positioned to permit a degree of separation within said groove sufficient to allow retention by pressure contact of at least an uncoded peripheral portion of said disc without scratching or otherwise damaging a remaining coded portion thereof, said lower portion further comprising a relatively narrow, arcuately configured peripheral shelf, located adjacent at least a portion of said semicircular groove, and wherein said upper portion of said base comprises an arcuately shaped raised plateau to support an upper circumferential portion of said disc;

(b) a lid integrally formed with said base, said lid having on at least a portion of a front face thereof a serrated gripping area to facilitate grasping of said lid for movement thereof to permit access to said digital disc, said lid further being configured and dimensioned to include a V-shaped lower edge for contact relation with a corresponding V-shaped edge portion of said housing, which V-shaped housing edge ensures insertion and removal of said disc in a manner which avoids damage to information-bearing areas thereof; and (c) a parallel pair of vertical channel members located on a rear surface of said base, said channel members oriented substantially perpendicularly to said hinge means, each said channel member being of a sufficient depth, along the upper portion of said base, to form a corresponding raised ridge on a reverse side of said channel member along a front face of said base, each said channel member further comprising a first sloping ramp member projecting substantially perpendicularly from said base in said lower portion thereof, said first ramp member configured for non-reciprocal sliding movement over a correspondingly positioned and configured second ramp member on an inner surface of a rear wall of said housing, and further, each said channel member having a projecting button member located in the upper portion thereof to facilitate snap-locking engagement of said base within said housing.

6. The insertable drawer member of claim 5 wherein said housing further comprises, on an inner surface of a front face thereof, at least one elongated horizontal member projecting inwardly therefrom which defines an aperture between said front face and said base member configured in the form of a shallow elongated funnel so as to prevent any portion other than an uncoded edge of said disc from contacting either said drawer member or said housing when said disc is accessed.

7. The insertable drawer member of claim 6 wherein said V-shaped edge portion of said housing comprises a semicircular grooved portion positioned and adapted to permit insertion of a finger therethrough and thereafter through a corresponding aperture defined by said disc to facilitate removal of said disc from said drawer member without damage to said information bearing areas thereon.

8. The insertable drawer member of claim 7 wherein said housing comprises two said elongated horizontal members, each configured in the form of a ¼ cone having a rounded outer surface, said elongated members positioned on an inner surface of a front face of said housing, on either side of said semicircular groove.

9. The insertable drawer member of claim 5 wherein said upper portion of said base further comprises at least one pair of projecting rib members extending perpendicularly from a front face thereof for supporting a promotional booklet above said disc.

10. The insertable drawer member of claim 9 wherein said rib members are parallel to one another and extend substantially perpendicularly along a first and a second lateral peripheral edge, respectively, of said base.

11. The insertable drawer member of claim 10 wherein said base further comprises a second pair of perpendicularly projecting parallel rib members, said second pair of rib members spaced inwardly apart from and parallel to said first pair.

12. The insertable drawer member of claim 11 wherein a front face of said arcuately shaped seat member has at least one button member projecting upwardly therefrom, each said button member positioned and adapted for supporting a lower portion of said promotional booklet packaged with said disc.

13. The insertable drawer member of claim 5 wherein said seat member comprises, along a first and a second peripheral edge portion thereof, a free floating flexible projecting member, each said flexible member not attached to an adjacent one of said side walls and further, said flexible members configured and adapted to facilitate insertion of said disc within said semicircular groove while preventing entry therein of a promotional booklet packaged with said disc.

14. The insertable drawer member of claim 13 wherein said first and said second finger members project upwardly from said seat member at an angle of less than about 45° therefrom to facilitate correct positioning of said disc and said booklet.

15. A container configured and dimensioned for receiving and storing optically readable and recordable discs such as compact discs, CD-ROMs, video laserdiscs and the like upon a drawer member adapted for reciprocal back and forth motion within an outer protective housing in a manner which ensures that information bearing areas of said discs are not damaged during insertion or removal from said container, said container comprising:

(a) an outer housing member configured and adapted for insertion and reciprocal back and forth motion of said drawer member therein, said housing having a front face and a rear face, each said face having, along an upper edge portion thereof, a semi-circular groove configured to permit passage therethrough of at least one finger for subsequent insertion within a corresponding aperture defined by said disc to facilitate removal and insertion of said disc, said front face comprising, adjacent said semicircular groove thereon, a V-shaped edge portion configured to prevent all but an uncoded edge portion of said disc from contacting said housing during insertion and removal therefrom said front face further comprising, on an inner portion thereof on both sides of said semicircular groove, elongated horizontal members each configured in the form of a ¼ cone having a rounded outer edge portion, said ¼ cone members defining between said front face and said drawer member an aperture configured in the form of a shallow elongated funnel to prevent any portion other than an uncoded edge portion of said disc from contacting either said drawer member or said housing when said disc is accessed;

(b) a base at least partially defined by a pair of opposed parallel side walls, said base being divided into an upper portion and a lower portion by hinge means located therebetween to permit the downward rotation of said upper portion from a first position coplanar with said lower portion to a second position spaced a distance therefrom, said lower portion comprising an arcuately shaped seat member spaced a distance apart from a flat plate member, said seat member and said plate member forming a front face and a rear face, respectively, of a semicircular groove, wherein said groove is defined by the space therebetween, said seat member comprising, along a first and a second peripheral edge portion thereof, a free floating projecting member, each said projecting member not attached to an adjacent one of said side walls and projecting upwardly from said seat member at an angle of less than about 45° therefrom to facilitate correct positioning of said disc, and further, a portion of said plate member forming a rear face of said groove being at least partially detached from a remaining portion of said plate portion, said semicircular groove additionally comprising at least one member positioned to permit a degree of separation within said groove sufficient to allow retention by pressure contact of at least an uncoded peripheral portion of said disc without scratching or otherwise damaging a remaining coded portion thereof, said lower portion further comprising a relatively narrow, arcuately configured peripheral shelf, located adjacent at least a portion of said semicircular groove, and wherein said upper portion of said base comprises an arcuately shaped raised plateau to support an upper circumferential portion of said disc and at least one pair of substantially parallel rib members extending perpendicularly from said base, said rib members positioned and configured to operate, in cooperation with a pair of button members extending upwardly from a front face of said arcuate seat member, so as to support a promotional booklet packaged with said disc;

(c) a lid integrally formed with said base, said lid having on at least a portion of a front face thereof a serrated gripping area to facilitate grasping of said lid for movement thereof to permit access to said disc, said lid further being configured and dimensioned to include a V-shaped lower edge for contact relation with said corresponding V-shaped edge portion on said front face of said housing; and (d) a parallel pair of vertical channel members located on a rear surface of said base, said channel members oriented substantially perpendicularly to said hinge means, each said channel member being of a sufficient depth, along the upper portion of said base, to form a corresponding raised ridge on a reverse side of said channel member along a front face of said base, each said channel member further comprising a first sloping ramp member projecting substantially perpendicularly from said base in said lower portion thereof, said first ramp member configured for non-reciprocal sliding movement over a correspondingly positioned and configured second ramp member on an inner surface of a rear wall of said housing, and further, each said channel member having a projecting button member located in the upper portion thereof to facilitate snap-locking engagement of said base within said housing.

* * * * *